July 24, 1951 K. EMDE 2,561,792

RECORD CHANGING MECHANISM

Filed Sept. 17, 1945 4 Sheets-Sheet 1

KURT EMDE
INVENTOR.
BY David M. Davis
Frank L. Mauritz
HIS ATTORNEYS

July 24, 1951 K. EMDE 2,561,792

RECORD CHANGING MECHANISM

Filed Sept. 17, 1945 4 Sheets-Sheet 2

KURT EMDE
INVENTOR.

BY David M. Davis
Frank L. Mauritz

HIS ATTORNEYS

KURT EMDE
INVENTOR.
BY David M. [signature]
[signature] Mauritz
HIS ATTORNEYS

July 24, 1951 K. EMDE 2,561,792

RECORD CHANGING MECHANISM

Filed Sept. 17, 1945 4 Sheets-Sheet 4

KURT EMDE
INVENTOR.

BY David M. Davis
Frank L. Mauritz

HIS ATTORNEYS

Patented July 24, 1951 2,561,792

UNITED STATES PATENT OFFICE 2,561,792

RECORD CHANGING MECHANISM

Kurt Emde, Itasca, Ill., assignor to Zenith Radio Corporation, a corporation of Illinois Application September 17, 1945, Serial No. 616,842

5 Claims. (Cl. 274—10)

This invention relates to automatic phonographs and more particularly relates to an improved automatic record changer for phonographs.

It is desirable that record changing mechanisms be foolproof in operation, simple, economical to build and positive in operation to minimize record breakage.

Record changers with the conventional record supporting and separating knives must be manufactured with their dimensions maintained accurately, thus necessitating high manufacturing costs and complexity, otherwise there is a considerable amount of record breakage. For these reasons, it is desirable to provide record changers in which the stack of records is supported on a spindle having an offset shoulder from which the bottommost one only is fed to the record turntable by providing mechanism for shoving such bottommost record off the offset shoulder and allowing it to drop and be guided by the centering portion of the spindle, while the other records are maintained in suspended position ready for sequential feeding to the turntable.

In such record changers it is desirable to play either 10-inch or 12-inch records, and for that purpose it is desirable to provide a mechanism which causes the tone arm to be positioned for playing either a 10-inch record or a 12-inch record, depending upon the adjustment of the apparatus by a person, who may make such adjustments with ease.

It is therefore an object of the present invention to provide an improved record changer characterized in that it is simple in operation, economical to build, foolproof in operation, and functions with a minimum amount of record breakage.

A further object of the present invention is to provide an improved mechanism allowing easy adjustment of the record changer for playing a series of either 10- or 12-inch records, depending upon the wish of the operator.

Still a further object of the present invention is to provide a record changer of a type wherein the bottommost one of a series of records is supported at its center on an offset portion of the centering pin and a peripheral portion of such record is supported on an improved manually adjustable shelf structure which cooperates with an improved tone arm setting mechanism to adjust it simultaneously when the record supporting shelf is moved manually to its respective 10-inch or 12-inch position for playing either 10-inch or 12-inch records.

Yet a further object of the present invention is to provide an improved tone arm adjusting mechanism useful in record changers not only of the type utilizing an offset shoulder on the centering spindle for supporting records but also in other types.

Another object of the present invention is to provide an improved simple, compact, inexpensive mechanism operable upon the completion of the playing of a record for setting into motion mechanism utilizing a centering spindle with an offset shoulder, or for example rotating knives, such improved mechanism being characterized by a novel arrangement of parts for operating a clutch to transfer energy from the turntable driving motor for moving the tone arm out of the path of a falling record, actuating the record feeding mechanism, returning the tone arm to proper position, and recocking such improved mechanism in an improved manner so that it may be tripped at the completion of the playing of a record to set in motion again the mechanism for effecting a record changing cycle.

Another object of the present invention is to provide a spindle having an offset shoulder, the spindle being removable in part only.

The features of the present invention which are believed to be novel are set forth with particularity in the appended claims. The present invention itself, both as to its organization and manner of operation, together with further objects and advantages thereof, may best be understood by reference to the following description taken in connection with the accompanying drawings, in which:

Figure 1:
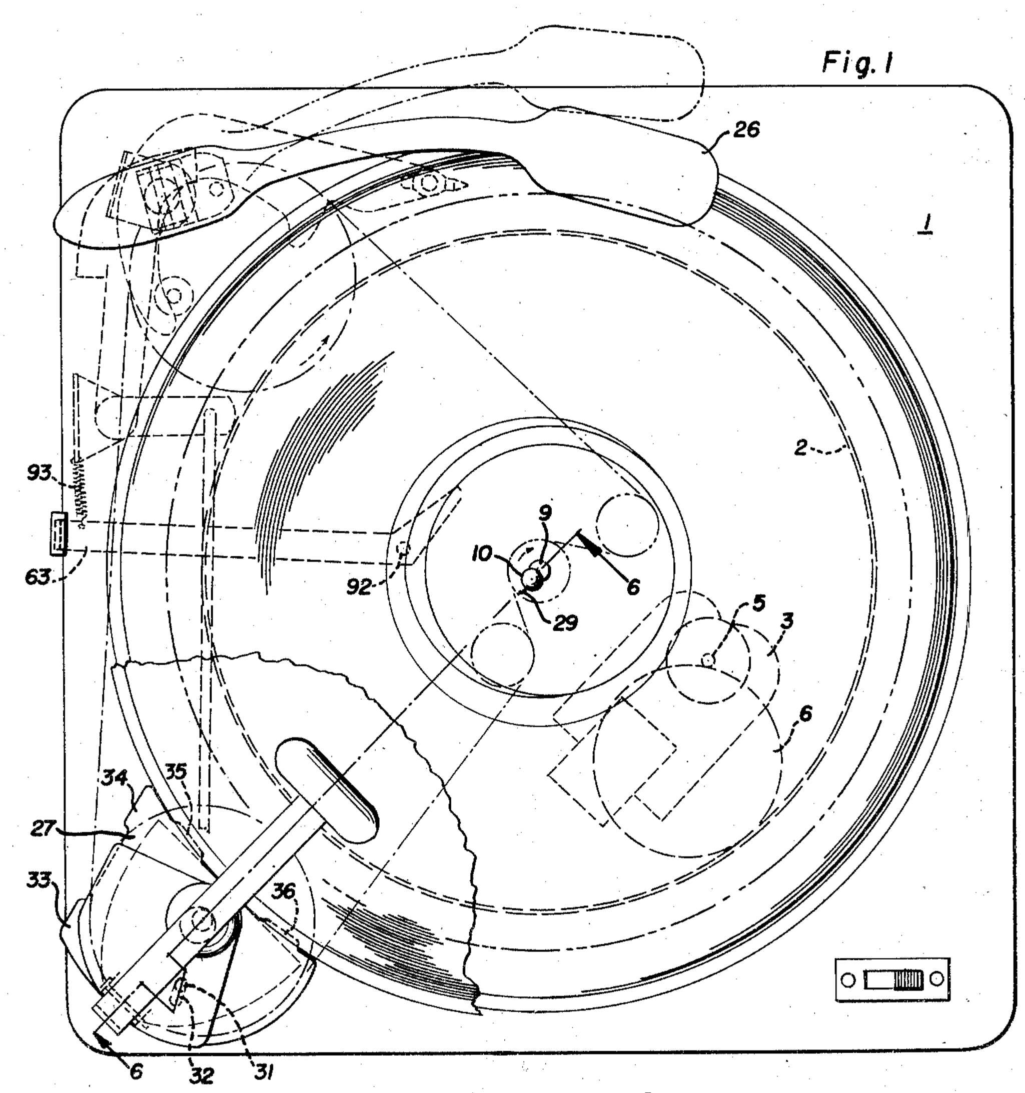
Figure 1 is a plan view of an improved record changer incorporating the present invention, in which the tone arm is shown at the end of its outward swing in phantom lines and in full lines at the start of playing of a 12-inch record.
Figure 3:
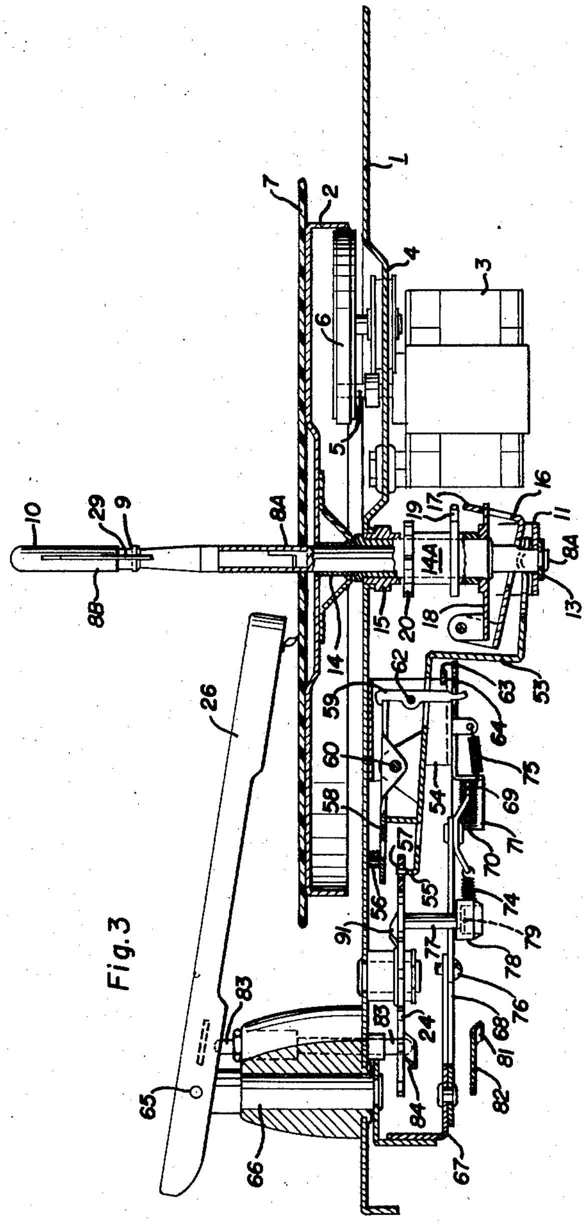
Fig. 3 is a sectional view taken substantially on the line 3—3 of Fig. 2 rotated 45° to the right and inverted, but with the parts shown therein in their relative positions during the record playing cycle.
Figure 5:
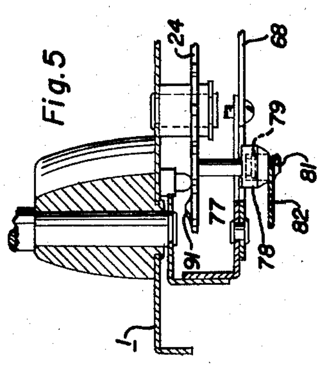
Figs. 4 and 5 show parts of the apparatus shown in Fig. 3 but in different operating positions, Figs. 4 and 5 showing the parts in different positions in the record changing cycle wherein the tone arm will be positioned for a 10-inch record.
Figure 4:
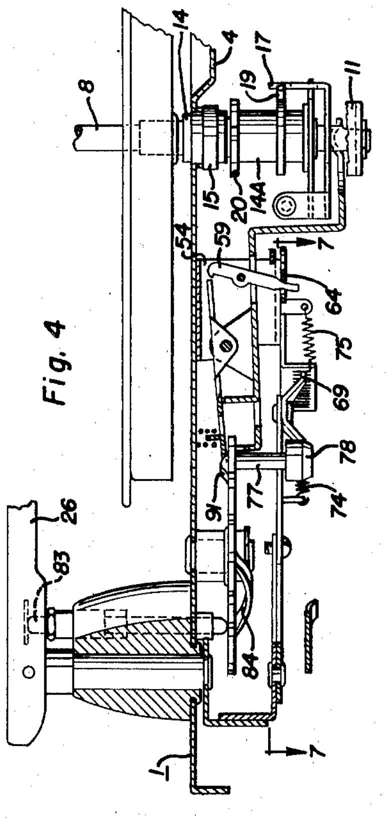
Figure 11:
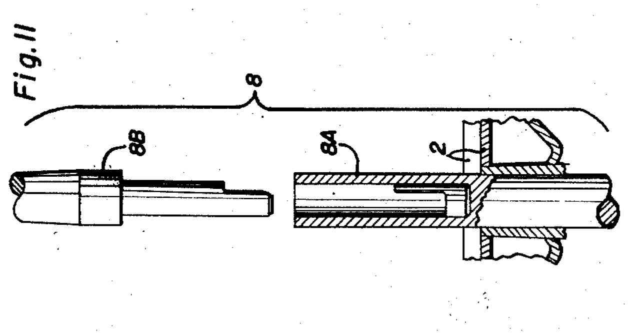
Figure 10:
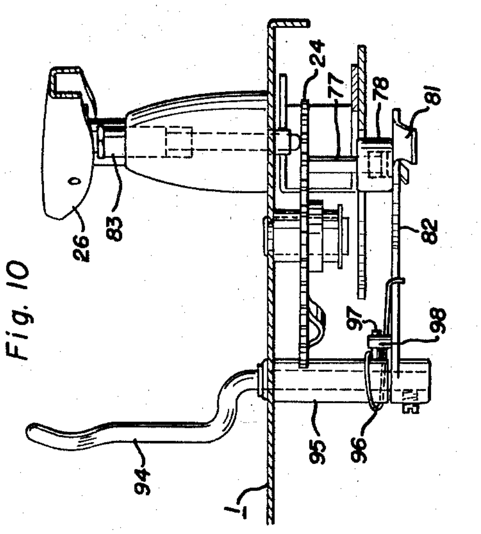
Figure 9:
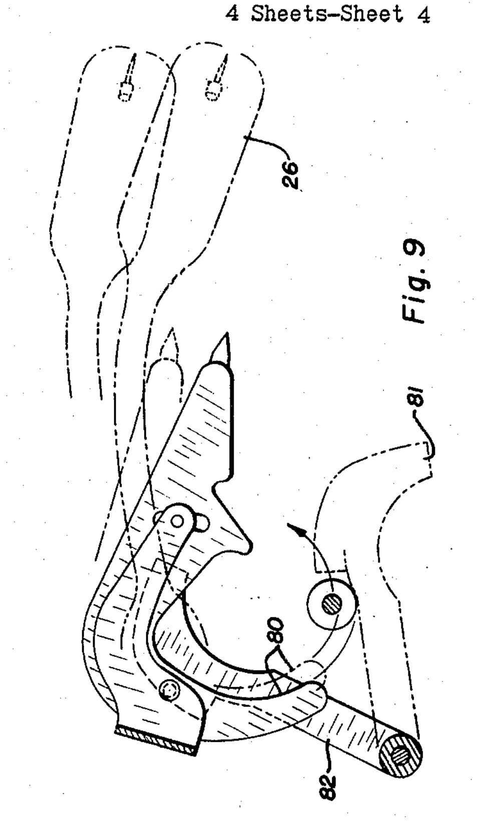
Figure 7:
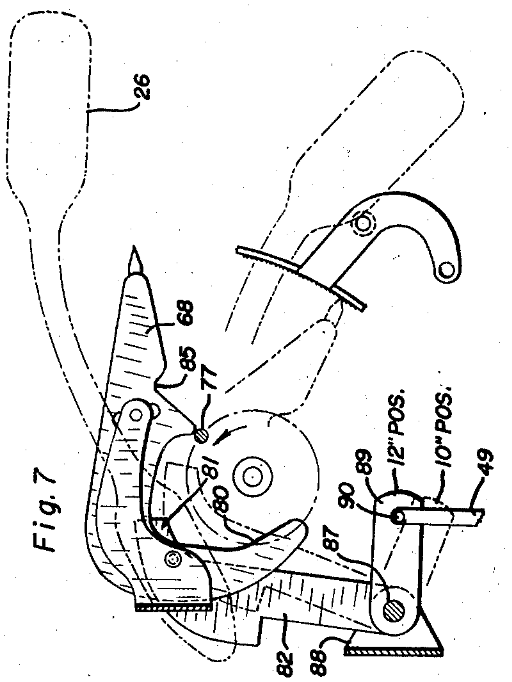
Figure 8:
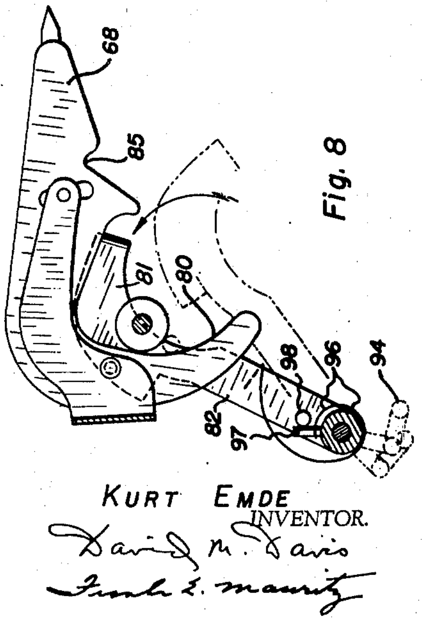

Fig. 7, a sectional view taken substantially on line 7—7 of Fig. 4, shows parts of the tone arm adjusting mechanism shown in Figs. 1 and 3 in different operating positions, and the relative positions when the tone arm is being adjusted for 12- and 10-inch records;

Figs. 8, 9 and 10 show a modified construction engaged by a falling record for adjusting the initial position of the tone arm for playing a record, and Fig. 11 is an enlarged view showing details of the record spindle of the record changer of Figs. 1–7, inclusive.

In accordance with the present invention, there is provided in an automatic record changer including a rotatable turntable and a motor, the combination of a mechanism adapted to be driven by the motor for successively transferring successive ones of a plurality of records into playing position on the turntable during successive record changing cycles, and means actuated by movements of the mechanism for establishing a driving connection between the motor and the mechanism thereby to initiate one of the record changing cycles.

*Turntable and record changing mechanism drive*

Figure 2:
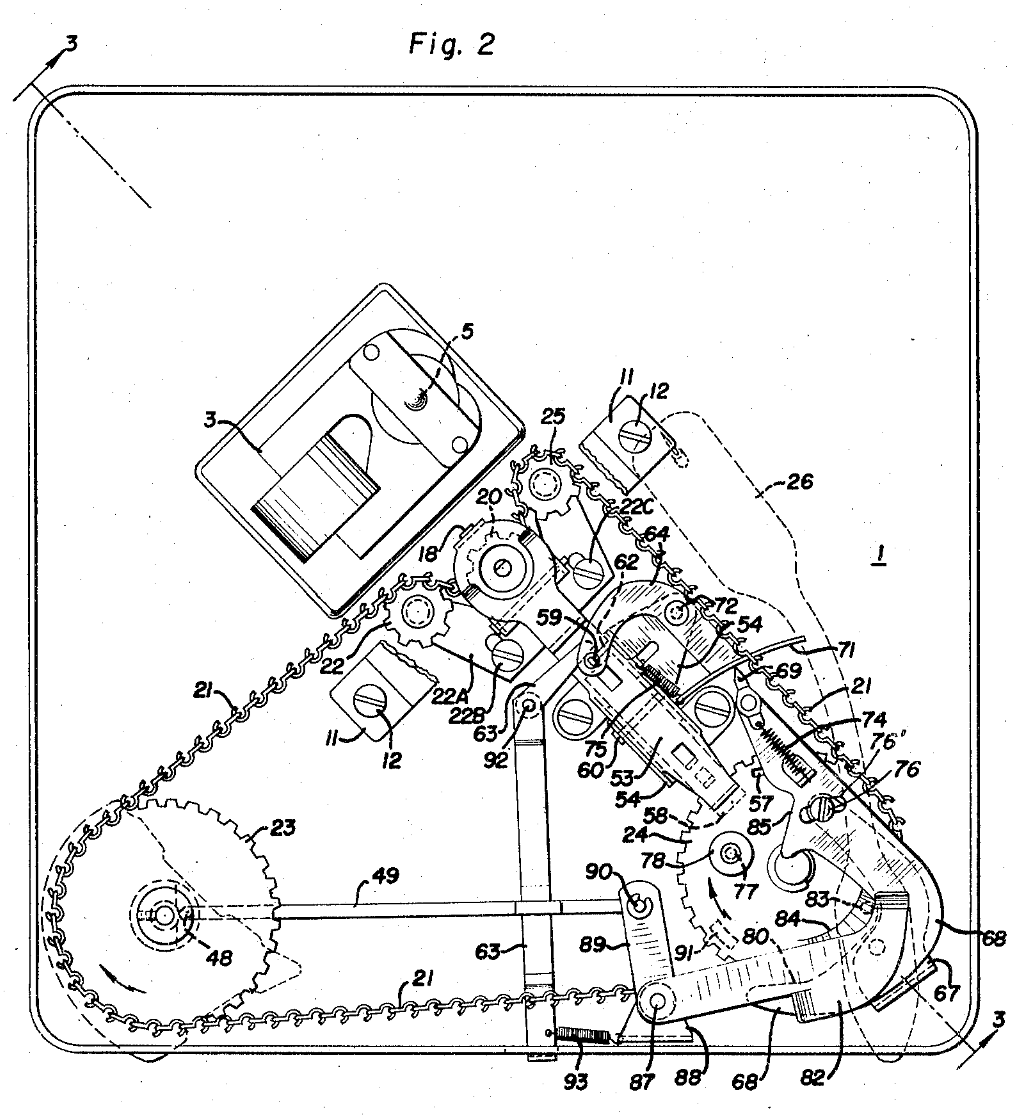
Fig. 2 is a view in elevation of the bottom of the record changer shown in Fig. 1, but with the parts shown in their relative positions immediately after the record changing cycle is initiated by reverse movement of the tone arm in the oscillatory trip groove of a record.

Referring now more particularly to Figs. 1, 2 and 3 of the drawings, there is shown a base plate 1 upon which the record changer mechanism is mounted. For playing records there is provided a turntable 2 driven by a motor 3 mounted on a mounting plate 4 integrally formed with base plate 1. Between the motor shaft 5 and the rim of the turntable 2 there is provided a friction wheel 6 rotatably mounted on the mounting plate 4, rotary motion of the motor being transferred to the turntable through the friction wheel 6.

For centering record 7 on the turntable there is provided a fixed spindle 8 having an offset shoulder 9 adapted to support the center of the bottommost record threaded on the offset portion 10 of the spindle 8.

The stationary spindle 8 extends downwardly through the relatively movable turntable and has its bottommost end held by bracket 11 fastened on base plate 1 by means of, for example, screws 12, the end of spindle 8 being flattened and snugly received in a noncircular opening in bracket 11. A washer 13, removable and of resilient nature, disposed on a point on spindle 8 of reduced diameter and between the end of spindle 8 and bracket 11, locks spindle 8 against upward movement. The intermediate portion of the spindle 8 serves as a bearing member for the inner portion of sleeve 14. The outer portion of the sleeve 14 is journaled for rotation within a second sleeve 15 fixed on base plate 1 by, for example, welding, shrink fit, etc.

It is clear from the construction thus far described that the spindle 8 may be removed by removing the resilient washer 13 and moving the spindle 8 upwardly if need be to remove the spindle 8.

The turntable 2 is preferably permanently mounted on the sleeve 15 without end play by providing in conventional manner permanent or movable shoulders on the turntable sleeve 14 where it enters the larger inner diameter opening of sleeve 15.

It is also clear that the turntable 2 is mounted for rotation about an axis passing through the axis of the lower portion of centering pin 8, the turntable 2 being driven by motor 3 through friction wheel 6. Normally, during the record playing cycle, the turntable sleeve 14 rotates independently of outer sleeve 14A rotatably mounted thereon, but during the record changing cycles these two sleeves 14 and 14A are rotated simultaneously through a clutch having the general reference numeral 16. Suffice it to say for the present that clutch 16 is actuated by tone arm responsive means described later, and that the clutch itself comprises finger 17 pivotally mounted on an extension 18 of turntable sleeve 14, the end of finger 17 being movable upwardly in Fig. 3 to engage extension 19 on sleeve 14A to rotate sleeve 14A and the integrally formed sprocket wheel 20 arranged to transmit motion to an endless sprocket chain 21 which in turn passes over an idler wheel 22, sprocket wheel 23, sprocket wheel 24, idler wheel 25, back to sprocket wheel 20 to impart motion to the components of the record changing mechanism. The pair of idlers 22 and 25 are adjustably mounted for rotatable movement on the U-shaped mounting plate 22A which is adjustably held on base plate 1 by means of set screws 22B, 22C.

Sprocket wheel 23 serves to impart motion to the record feeding mechanism described later, while sprocket wheel 24 is modified not only to move the tone arm 26 properly during the record changing cycle but also to cause suitable operation of tripping mechanism described later to cause movement of finger or lever 17 of clutch 16 to its driving position and cause feeding of records from a record supporting structure described now.

*Record supporting and feeding structure*

The record changer of Figs. 1 to 7 may in its preferred form feed a series of 10-inch records or a series of 12-inch records, depending upon the position of a manually adjustable 2-position shelf 27, although certain mechanisms of the record changer may be used in record changers of the knife type. In fact, certain described mechanisms shown and described in connection with Figs. 1 to 7 may be modified as shown in Figs. 8 to 10 whereby certain parts of the mechanism of Figs. 1 to 7 below the turntable may be actuated by a falling record, regardless of how it is initially supported by, for example, knives or other transfer mechanism.

Figure 6:
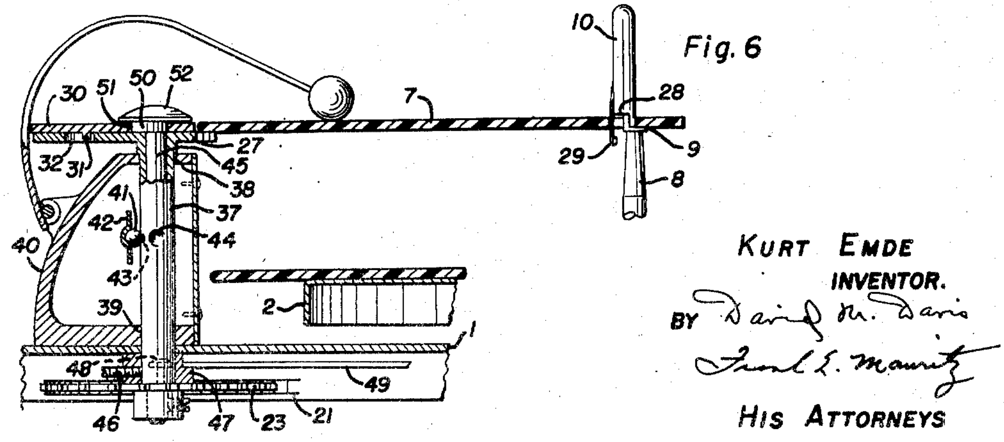
Fig. 6 is a sectional view taken substantially on line 6—6 of Fig. 1, wherein a 12-inch record is held in position on the adjustable shelf 27.

Referring to Figs. 1 and 6, the record changer preferably includes the centering spindle 8 having an offset shoulder 9 with an upper surface substantially coplanar with the upper surface of adjustable shelf 27, such surface of shoulder 9 being displaced from the terminating surface 28 of portion 10 by a distance slightly greater than the thickness of a 12-inch record. A spring 29 having one of its ends fastened within a recess in the offset portion 10 and its free end extending in the space between the upper surface of shoulder 9 and surface 28 presses the bottommost record supported on shoulder 9 to the left in Fig. 6 against the offset portion 10 to insure the dropping of one record at a time when the pusher plate 30 is oscillated by means described later.

The pusher plate 30 has a thickness slightly less than the thickness of a 10-inch record, and suffice it to say for the present that it is moved in a direction parallel to its plane during the record changing cycle to engage the bottommost record in a stack of records so as to move it against the biasing action of spring 29 beyond the edge of shelf 27 and shoulder 9, from where the record 7 falls by gravity down the centering spindle 8. When the record supporting shelf 27 is moved manually to one of its two positions for supporting either a series of 10-inch records or a series of 12-inch records, the pusher plate 30 is moved therewith substantially simultaneously due to engagement of pusher plate extension 31 with the wall defining the opening 32 in shelf member 27.

The record supporting shelf in a first position thereof has a pair of extensions 33, 34 upon which the outer portion of a 10-inch record is adapted to rest, and also a pair of extensions 35, 36 upon which a corresponding outer portion of a 12-inch record is adapted to rest in a second position of the shelf displaced 90° from such first position. Thus, in Figs. 1 and 6 an outer portion of a 12-inch record is shown supported on extensions 35 and 36, while the center portion thereof is supported on offset shoulder 9.

The record supporting shelf 27 has integrally formed thereon a sleeve 37 which is journaled for rotative movement without substantial end play in adjacent portions 38, 39 of a housing 40 which in turn is fixedly mounted on base plate 1. Mounted within housing 40 is a ball 41 spring pressed by resilient member 42 having one end thereof fastened to housing 40 and its other end indented to receive ball 41 to press it into either one of two recesses 43, 44 displaced 90° from one another in sleeve 37 to frictionally hold shelf 27 in proper position without producing too much friction for adjusted movement of the shelf 27 by hand and yet producing sufficient static frictional forces to hold shelf 27 in adjusted position even though the shaft 45 mounted therein is rotated within sleeve 37.

Sleeve 37 has affixed thereon by means of set screw 46 an enlarged sleeve 47 having a pin 48 passing through a reentrant portion therein to hold one end of a tone arm adjusting arm 49.

Journaled within sleeve 37 is a shaft 45 having an eccentric portion 50 adapted to move within a suitable opening 51 in pusher plate 30, a head 52 on one end thereof adapted to maintain pusher plate 30 on shelf member 27 and the sprocket wheel 23 fastened on its other end.

Sprocket wheel 23 driven by sprocket chain 21 only during the record changing cycle is arranged to make only one revolution per record changing cycle during which the eccentric portion 50 imparts an oscillatory movement to pusher plate 30 in the direction of its plane to push a record off the shelf 27 upon which the bottommost record of a stack normally rests. The tone arm adjusting arm 49, of course, does not move during the record changing cycle but is moved only when the shelf 27 is moved manually to one of its two adjusted positions in which spring pressed ball 41 enters either one of the two recesses 43 and 44.

It is noted that pusher plate 30 has a downwardly extending projection 31 which extends into an opening 32 in shelf member 27 to limit relative movements between pusher plate 30 and shelf member 27 to a small degree when the operator engages either shelf member 27 or pusher plate 30 to move the shelf member to adjusted position.

It is thus clear that shelf member 27 may be manually moved to one of two adjusted positions and that during a record changing cycle when sprocket wheel 23 makes a complete revolution, an oscillatory movement is imparted to pusher plate 30 to such an extent that either a 10-inch record or a 12-inch record is shoved off the shelf member, depending upon the initial adjustment of the shelf member 27, it being remembered that a record changing cycle is effective when the clutch 16 is actuated.

*Clutch actuating mechanism*

In order to actuate clutch 16 or, in particular, in order to bring the clutch lever 17 into engagement with the extension 19 against the gravity forces acting on finger or clutch lever 17 to initiate a record changing cycle, there is provided lever 53 which is pivotally supported intermediate its ends by a supporting bracket 54 mounted on the bottom of base plate 1 as shown in Figs. 2, 3 and 4. For arresting the motion of the record changing mechanism not only at the end of a record changing cycle but also during the record playing cycle, the lever 53 is provided with an extension 55 which is adapted to come into engagement with an opening 57 in the sprocket cam wheel 24 when coil spring 56 is compressed, which opening is of elongated rectangular shape with its short side extending radially on the sprocket cam wheel 24 as shown in Fig. 2. When the coil compression spring 56 is allowed to exert its force on lever 53, its right end is moved upwardly to engage clutch lever 17 to in turn cause engagement between clutch lever 17 and extension 19 to initiate a record changing cycle. During the record playing cycle, spring 56 is prevented from exerting its force against actuating lever 53 due to the fact that an intermediate force transmitting element, the pivoted lever 58, is prevented from moving since, as shown in Fig. 3, it is held in latched position during the record playing cycle by means of pivoted latch member 59.

As seen most clearly in Fig. 3, coil spring 56 does not rest on the actuating lever 53 directly, but the force from such spring is transferred initially through the lever 58 pivoted at point 60 intermediate its ends on bracket 54 which in turn is mounted on base plate 1. The left end of lever 58 in Fig. 3 serves as a link to connect spring 56 to actuating lever 58 while the position of the right end of lever 58 may be controlled by the latch member 59 pivoted on pin 62 having one of its ends fixed in bracket 54.

Latch member 59 may have its lower end controlled in position by either (1) an arm 63 forming a part of the phonograph "reject" mechanism (described later) or (2) by an arm 64 forming a part of the tone arm tripping mechanism (described under the next heading), the function of such arms 63 and 64 being to transmit clockwise movement (Fig. 3) to latching member 59 to free pivoted lever 58 so that it may transmit to actuating lever 53 the force developed in compression spring 56 to, in turn, cause counterclockwise movement of actuating lever 53 and engagement of clutch members 17 and 19 to initiate a record changing cycle.

*Tripping mechanism actuated by tone arm*

For actuating the clutch 16 at the end of each record playing cycle and thereby to initiate a record changing cycle, the tone arm 26 is pivotally hinged at point 65 to a rotatably mounted shaft 66, to the other end of which a suitable extension 67 is fixedly attached to hold an adjustable plate 68, which in turn supports tripping pawl 69, the plate 68 having suitable cam surfaces arranged to be engaged by means (described later) for properly positioning the tone arm at the starting point of either a 10-inch or a 12-inch record, as the case may be. The tripping pawl 69 and cooperating ratchet portion 70, comprising a series of saw-toothed embossments or indentations on the curved portion 71 of tripping arm 64 which is pivoted at point 72 on the mounting bracket 54, cooperate upon reverse movement (clockwise in Fig. 2) of the tone arm, for example, in the oscillatory tripping groove of a record to pivot tripping arm 64 in a counterclockwise direction (Fig. 2) to move latching member 59 to its unlatched position to initiate a record changing cycle. During the record playing cycle the pawl 69, normally spring biased by tension spring 74 to extend in a radial direction about the axis of shaft 66, moves slowly over the ratchet surface portion 70 without pivoting the trip arm 64 from its normal position wherein it is biased by tension spring 75 to its furthest clockwise position (Fig. 2) to normally press the latching member 59 into engagement with the pivoted lever 58 (Fig. 3), but when the tone arm is given a reverse movement motion such reverse motion is imparted to the pawl 69 and causes positive engagement with the ratchet portion 70 and consequent movement of trip arm 64 and latching member 59 to initiate a record changing cycle as described previously.

*Automatic setting of tone arm at beginning of playing either 10-inch or 12-inch records*

The main elements for automatically setting the tone arm to its proper position for starting the playing of 10- or 12-inch records, as the case may be, are: The cam plate 68 initially fastened in adjusted position by means of set screw 76 which passes through the slot 76′ in the plate, and pin member 77 having slidably mounted thereon cylindrically shaped slug member 78 of predetermined dimensions which normally rests, due to gravity forces acting thereon, against the enlarged head 79 from where it may be displaced upward under certain conditions during the record changing cycle when and as the sprocket wheel 24 carrying pin member 77 is rotated by the sprocket chain 21. For the present, suffice it to say that when the tone arm is placed in proper starting position for playing 12-inch records, pin member 77 engages the cam edge 80 of cam plate 68 as shown in Fig. 7, and that when the tone arm is placed in proper starting position for playing 10-inch records the slug member 78 moved upward by the cam surface 81 on slug elevating cam member 82 engages the cam edge 80 as shown in Fig. 8 to move the tone arm to its proper starting position, the cam member 82 being placed in either one of its two adjusted positions, corresponding to the playing of 12-inch or 10-inch records, by the tone arm adjusting arm 49 which is moved simultaneously when the record supporting shelf 27 is adjusted as described previously in detail. It is noted that the wall thickness of the hollow cylindrical slug member 78 corresponds to the difference in radius of a 10-inch and a 12-inch record in order to effect the proper adjustment.

Referring to Fig. 2, during the record changing cycle the sprocket wheel 24 is rotated in the direction of the arrow, the tone arm is lifted by tone arm pusher rod 83 (shown more clearly in Figs. 3 and 4) which during the record playing cycle is held by gravity forces acting thereon in the recessed cam portion 84 of sprocket wheel 24 but which during the record changing cycle rides on the upper surface of sprocket wheel 24 to hold the tone arm in nonoperating position, the pin member 77 initially engages the cam edge 85 of cam plate 68 to move the tone arm outwardly from the center of the turntable and later engages the cam edge 80 of plate 68 provided the machine is adjusted to play 12-inch records, and then rotates further out of engagement with the plate 68 after the tone arm is allowed to drop on the 12-inch record by tone arm pusher rod 83 entering the cam recess 84 in the sprocket wheel 24.

When the machine is adjusted for playing 10-inch records, during the record changing cycle as described above, the sprocket wheel 24 is rotated in the direction of the arrow, the tone arm is lifted by the tone arm pusher rod 83, pin member 77 engages the cam edge 85 of cam plate 68 to move the tone arm outwardly from the center of the turntable to allow another record to fall by gravity thereupon, the slug member 78 normally resting in its downward position on enlarged pin head 79 rides on cam surface 81 of the slug positioning cam 82 up to the upper surface thereof where the slug member 78 is in a position to contact the cam edge 80 of cam plate 68 to properly position the tone arm above the starting groove of a 10-inch record, and upon further rotation of the single revolution sprocket wheel 24, at the end of its cycle, the slug 78 falls by gravity to its most downward position from which it either may again be raised to contact cam edge 80 when another 10-inch record is changed, or in which it may remain out of engagement with cam edge 80 when a 12-inch record is changed. That is, when a 10-inch record is changed slug member 78 contacts edge 80 to properly position the tone arm at the starting groove of a 10-inch record while, when a 12-inch record is changed, pin member 77 contacts edge 80 to properly position the tone arm at the starting groove of a 12-inch record, the slug member 78 either being moved to operative position when 10-inch records are played or allowed to remain in its "inoperative" position when 12-inch records are played.

It is noted that the slug positioning cam 82 has two positions corresponding to the operative and "inoperative" positions of the slug member 78, and that the cam 82 is moved simultaneously into one of these two positions upon movement of the record supporting shelf 27, it being seen that the cam member 82 is pivoted at point 87 on the mounting standard 88 and attached to an arm 89 which in turn is connected to the actuating arm 49 through a pin connection 90.

*Automatic operation for 10-inch records*

When the tone arm is given a rearward movement, for example, by the phonograph needle traveling in the eccentric end groove of a record, the tripping pawl 69 engages the ratchet portion 70 to move the pivoted latch member 59 to unlatched position, thus allowing compression spring 56 to exert its full force on clutch actuating lever 53 to move clutch members 17 and 19 into engagement and to cause extension 55 of the clutch actuating lever to be withdrawn from its locking position in sprocket wheel opening 57, whereupon a driving connection is made between the motor 3 and the sprocket chain 21 which is effective to drive the sprocket wheels 23 and 24 one revolution per record changing cycle, after which the clutch members 17 and 18 are automatically disengaged. One revolution of sprocket wheel 23 causes oscillation of the pusher plate 30 and a record to be dropped from the offset shoulder 9 upon the turntable. Simultaneously, one revolution of sprocket wheel 24 causes pusher rod 83 to move upwardly out of the sprocket wheel recessed cam portion 84 to lift the tone arm, the pin 77 is rotated whereupon slug member 78 loosely carried thereon moves upwardly thereon when it engages the cam surface 81 of the slug positioning cam 82 which is adjustably positioned within an arc of movement of the slug member 78 to cause contact between the slug member 78 and cam edge 80 when and as the pusher rod 83 reenters the sprocket recessed cam portion 84, whereupon the tone arm is correctly positioned on a phonograph record at the start of the playing groove. During the remaining portion of the revolution of sprocket wheel 24, the slug member 78 becomes disengaged from the cam edge 80 and the slug positioning cam 82, after which the slug member falls by gravity to its normal position. Also, during one revolution of sprocket wheel 24, a raised cam portion 91 on sprocket wheel 24 abuts against the left end (Fig. 3) of pivoted lever 58 to move it upwardly against compression spring 56, whereupon the latch member 59 biased by spring 75 maintains spring 56 in compressed condition after cam 91 moves out of engagement with pivoted lever 58, in which case the clutch actuating lever extension 55 enters the cam wheel opening 57 after further rotation of the sprocket wheel 24, and the clutch actuating lever 53 is allowed to fall by gravity, whereupon clutch members 17 and 19 become disengaged, resulting in a positive locking of the record changing mechanism after one revolution of the sprocket wheels 23 and 24. The clutch 16 may then, after a record playing cycle, be engaged again as explained previously.

*Automatic operation for 12-inch records*

The operation for 12-inch records is the same as described above in connection with "Automatic Operation for 10-Inch Records" but the slug member 78 does not engage the cam 82, in which case the pin member directly contacts the cam edge 80 instead of the slug member 78.

*Reject mechanism*

The record changing cycle may be initiated by manipulating reject lever 63 which is bent to extend from the top of the turntable to its pivot point 92 below the turntable. An end of the lever 63 is biased out of contact with the pivoted latch member 59 by means of tension spring 93 having one end fastened to lever 63 and its other end attached to the bracket 88. It is clear that when the reject lever 63 is moved against the action of tension spring 93, the pivoted latch member 59 is moved to its unlatched position and a record changing cycle is initiated.

Figs. 8, 9 and 10 show a modified structure for adapting the mechanism described heretofore for operation with a so-called intermixing type of record changer, in which records of either 10-inch or 12-inch diameter may be fed indiscriminately to the turntable from a support of the rotating knife type, etc. In accordance with this modification, a movable record discriminator 94 is mounted above a turntable in the path of a falling 12-inch record only for movement thereby to hold the slug positioning cam member 82 out of the path of movement of the slug member 78 in a manner similar to that described above.

The cam member 82 is normally positioned as shown in Fig. 10, corresponding to a position wherein the tone arm is adjusted for playing a 10-inch record, in which case during the record changing cycle the gravity positioned slug member 78 is raised upwardly against the force of gravity due to its engagement with the upward sloping surface 81 of slug elevating cam member 82 upon which the slug member 78 travels in a position to contact the cam edge 80 of cam plate 68 to position the tone arm for a 10-inch record in a manner described more fully in connection with the description of Figs. 1–7. The cam member 82 is rigidly connected to the discriminator element 94, an extension of which is journaled for pivotal movement in a sleeve 95, which in turn is fixed on the base plate 1. A coil spring 96, having one of its ends wrapped around the outer surface of sleeve 95 and anchored on stop pin 97 and its other end hooked over an edge of cam member 82, normally biases the cam member into its 10-inch position, with stop pin 97 on sleeve 95 engaging stop pin 98 on cam member 82. When a falling 12-inch record engages and moves the discriminator element 94, the cam member 82 is moved clockwise in Fig. 8 to allow the slug member 78 to drop from its position on the upper surface of cam member 82, thus allowing pin 77 to engage cam edge 80 to position the tone arm for a 12-inch record.

Referring to Fig. 11, in which spindle 8 is shown disassembled in its component parts 8A and 8B, it is seen that, inasmuch as spindle part 8B, having the offset record supporting shoulder, is normally held by gravity in the cylindrical opening of spindle part 8A, with a projection on part 8B having a flat surface thereon cooperating with a flat surface on part 8A to prevent rotational movement about the axis of the spindle, part 8B may be removed easily from the stationary part 8A at the will of the operator. Stationary part 8A should extend upward from the turntable a distance sufficient to allow centering and playing of a record when part 8B is removed but it should not extend up such a distance that a single record cannot be threaded manually on spindle part 8A without touching the record supporting shelf 27.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A mechanism for selecting and playing records of different sizes including a base plate, a tone arm rotatably supported on said base plate, a cam member connected with said tone arm for rotation therewith about the axis of rotation thereof, a tone arm actuating wheel supported from said base plate for rotation about a second axis spaced from said axis of rotation, a pin mounted in said wheel substantially parallel to and displaced from said second axis to move eccentrically with respect to said axis of rotation on rotation of said wheel, a cylindical member mounted on said pin in slidable relation thereto and movable from a normal position to a displaced position along said pin, said cam member and pin being positioned to engage each other during rotation of said wheel to move said cam member in such a direction and to such a position as to rotate said tone arm to a predetermined extreme position when said cylindrical member is in said normal position, said cylindrical member in said displaced position being positioned to engage said cam member, and said cylindrical member having a diameter sufficient to move said cam member and tone arm to a different predetermined extreme position, each of said predetermined positions corresponding to one size of selected record, and means for selectively moving said cylindrical member to said displaced position.

2. A mechanism for automatically selecting and playing records of a first and a second size including a base plate, a tone arm rotatably supported on said base plate, a cam member connected with said tone arm for rotation therewith about the axis of rotation thereof, a tone arm actuating wheel supported from said base plate for rotation about a second axis spaced from said axis of rotation, a pin mounted in said wheel substantially parallel to and displaced from said second axis to move eccentrically with respect to said axis of rotation on rotation of said wheel, a cylindrical member mounted on said pin in slidable relation thereto and movable from a normal position to a displaced position along said pin, said cam member and pin being positioned to engage each other during rotation of said wheel to move said cam member in such direction and to such a position as to rotate said tone arm to a predetermined extreme position when said cylindrical member is in said normal position, said cylindrical member in said displaced position being positioned to engage said cam member, and said cylindrical member having a diameter sufficient to move said cam member and tone arm to a different predetermined extreme position, each of said predetermined positions corresponding to one size of selected record, and means responsive to records of said first size for moving said cylindrical member to said displaced position.

3. A mechanism for automatically selecting and playing records of a first and a second size, said second size being greater than said first size, said mechanism including a base plate, a tone arm rotatably supported on said base plate, a cam member connected with said tone arm for rotation therewith about the axis of rotation thereof, a tone arm actuating wheel supported from said base plate for rotation about a second axis spaced from said axis of rotation, a pin mounted in said wheel substantially parallel to and displaced from said second axis to move eccentrically with respect to said axis of rotation on rotation of said wheel, a cylindrical member mounted on said pin in slidable relation thereto and movable from a normal position to a displaced position along said pin, said cam member and pin being positioned to engage each other during rotation of said wheel to move said cam member in such direction and to such a position as to rotate said tone arm to a predetermined extreme position when said cylindrical member is in said normal position, said cylindrical member in said displaced position being positioned to engage said cam member, and said cylindrical member having a diameter sufficient to move said cam member and tone arm to a different predetermined extreme position, each of said predetermined positions corresponding to one size of selected record, and means responsive to records of said first size for moving said cylindrical member to said displaced position.

4. In a record player including a rotatably movable tone arm and a record-changing element movable during a record changing cycle, a tone arm positioning system comprising: a cam mounted for movement about the axis of rotation of said tone arm, coupled to said tone arm and including a cam surface having an approximately C-shaped contour and supported in the vicinity of said record-changing element; a cam-engaging member positioned on said record-changing element for engagement with substantially all of said cam surface to actuate said cam and rotate said tone arm through a cycle of displacement to a first, predetermined position when said record-changing element is displaced through a cycle of movement; a second, cam-engaging member supported by said record-changing element for movement from a rest position to an actuating position wherein said second member is adapted to engage with substantially all of said cam surface to actuate said cam and rotate said tone arm through a cycle of displacement to a second predetermined position when said record-changing element is displaced through a cycle of movement; and a selector system for selectively displacing and positioning said second cam-engaging member from said rest position to said actuating position.

5. In a record player including a rotatably movable tone arm and a record-changing element movable during a record changing cycle, a tone arm positioning system comprising: a cam mounted for movement about the axis of rotation of said tone arm, coupled to said tone arm and including a cam surface supported in the vicinity of said record-changing element; a cam-engaging pin positioned on said record-changing element for engagement with said cam surface to actuate said cam and rotate said tone arm to a first, predetermined position when said record-changing element is displaced through a cycle of movement; a second, cylindrically shaped, cam-engaging member supported by said pin for longitudinal movement relative thereto for selective engagement with said cam surface to actuate said cam and rotate said tone arm to a second predetermined position when said record-changing element is displaced through a cycle of movement; and a selector system for displacing and positioning said second cam-engaging member.

KURT EMDE.

REFERENCES CITED

The following references are of record in the file of this patent:

UNITED STATES PATENTS

| Number | Name | Date |
|---|---|---|
| 1,938,810 | Collisen et al. | Dec. 12, 1933 |
| 2,291,158 | Holstensson et al. | July 28, 1942 |
| 2,309,197 | Lewis | Jan. 26, 1943 |
| 2,352,331 | Leline | June 27, 1944 |

FOREIGN PATENTS

| Number | Country | Date |
|---|---|---|
| 552,906 | Great Britain | Apr. 29, 1943 |